May 25, 1926.
C. T. DICKEY
1,586,076
PROCESS FOR PRODUCING PERFORATED SHEET SPONGE RUBBER
Filed April 4, 1925
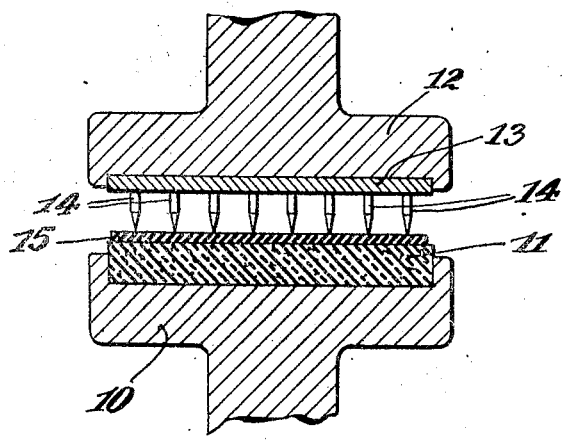
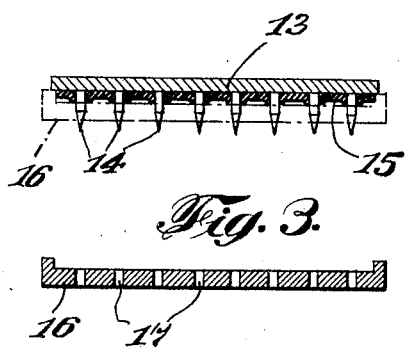
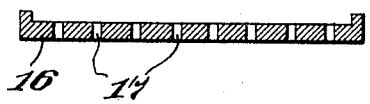
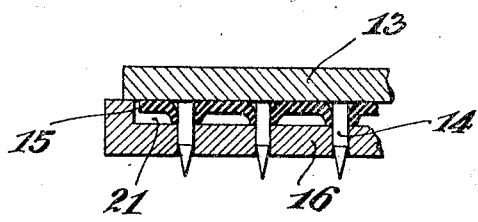
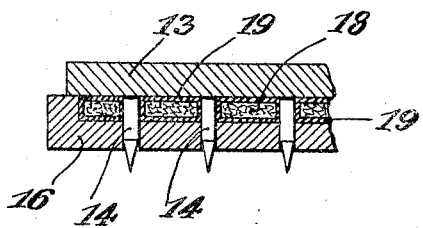
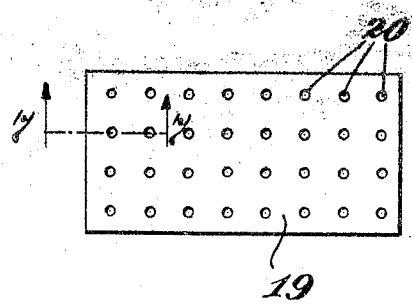
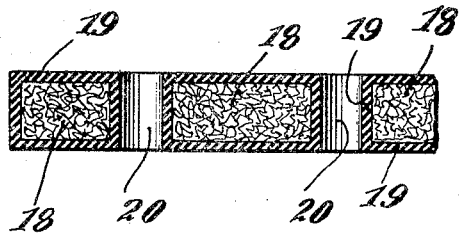
INVENTOR
Charles T. Dickey
BY
ATTORNEY Patented May 25, 1926.

1,586,076

UNITED STATES PATENT OFFICE.

CHARLES T. DICKEY, OF ELIZABETH, NEW JERSEY.

PROCESS FOR PRODUCING PERFORATED SHEET SPONGE RUBBER.

Application filed April 4, 1925. Serial No. 20,768.

My invention relates to a new, novel and useful form of sponge rubber and process for producing the same and refers particularly to sponge rubber in perforated sheet form.

Because of the lightness, heat transmission properties and other valuable attributes possessed by sponge rubber and which are not incident to solid rubber, sponge rubber has applications to which solid rubber cannot be so advantageously employed.

This is especially true when the sponge rubber is in sheet form.

In the employment of sponge rubber, it is frequently desirable that the sheet should have openings therethrough for purposes of ventilation, or in order that air or liquids may pass therethrough, and as examples of such use, mention may be made of bandages and corsets.

It is evident that if the interstices, or cells, of sponge rubber be exposed to moisture, or liquids, that the liquid will accumulate within the interstices, or cells, and that such an accumulation is highly undesirable, and injurious, when this action results where the sponge rubber sheet is maintained in close contact with the human body thereby producing the exudation and accumulation of perspiration. This accumulation of perspiration within the sponge rubber cells maintains the body in a moist condition, preventing the proper functioning of the skin cells, and resulting at times in serious irritations.

It is evident, therefore, that the proper and desirable efficiency of sponge rubber sheets for the purposes mentioned, and other similar uses, is dependent upon the non-absorbent properties of the rubber.

The present employed method for producing perforated sponge rubber sheets is to punch out, or cut out, a plurality of portions of the sheet, thus producing a plurality of openings therethrough. The sheets employed for this purpose are frequently covered upon both faces with a thin layer of non-porous, non-absorbent rubber, between which is the main body portion of sponge rubber.

It is evident that when holes are formed in rubber sheets of this character by the punching-out process, the face walls of the openings, or perforations, are of exposed sponge rubber and that the interstices, or cells, of the rubber thus exposed will receive and maintain moisture passing therethrough, and that the acid, disagreeably odorous perspiration, in the uses mentioned, will be retained, and that the movement of the rubber sheet incident to its use will cause this perspiration to maintain the skin in a moist condition and cause an irritation thereof.

It is evident, therefore, that a proper perforated sponge rubber sheet should be of such a character and construction that not only should the two face surfaces be impervious to moisture, but that it is of equal importance that the walls of the perforations be also impervious to liquids.

The process of my invention overcomes the above mentioned undesirable properties and presents a means whereby the entire exposed surface of perforated sheet sponge rubber is made impervious to water, and in which all of the interstices, or cells, of the rubber are covered with a sheet of non-pervious rubber, including those within the walls of the perforations.

In the accompanying drawings illustrating the application of my process, similar parts are designated by similar numerals.

Figure 1 is a vertical cross-section showing the positions of the various elements prior to the formation of the perforation.

Figure 2 is a cross-sectional view showing the rubber after perforation.

Figure 3 is a cross-section of the perforated mold.

Figure 4 is an enlarged cross-sectional view of the rubber within the molds preparatory to vulcanizing.

Figure 5 is the same view as Figure 4, but after vulcanization and sponge formation.

Figure 6 is a top plan view of the finished perforated sponge rubber sheet.

Figure 7 is a cross-section through the line 7—7 of Figure 6.

The process of my invention is clearly shown when described in connection with the accompanying drawings.

A hydraulic plunger 10 carries a sheet of soft rubber 11. The corresponding hydraulic plunger 12 carries a removable plate 13 having a plurality of extended metallic perforating pins 14.14, a portion of each pin being cylindrical as shown. The sheet of unvulcanized rubber to be treated and perforated 15 is placed upon the soft rubber sheet 11, the unvulcanized rubber being of any suitable composition for the production of sponge rubber during vulcanization.

The two hydraulic plungers 10 and 12 are then moved toward each other, the pins 14.14, passing through the rubber sheet 15 and into the soft rubber sheet 11, the latter being employed to back up the rubber sheet 15 during the perforation process.

The plungers 10 and 12 are then moved apart and the plate 13 and rubber sheet 15 removed from the plunger 12. The rubber sheet 15 then has the general appearance shown in Figure 2.

The perforated mold element 16 having the perforations 17.17, exactly corresponding to the pins 14.14, is then placed over the pins 14.14 as shown in Figure 4, and the plate 13 and the mold element 16 are attached to each other by any convenient means.

This mold with the contained rubber is then heated and vulcanized, resulting in an expansion of the rubber sheet 15 and the formation of sponge rubber 18. It is to be noted that during this process the rubber has expanded to completely fill the chamber 21, and that the pressure of this rubber mass against the hot metal of the plate 13, the pins 14.14, and the plate 16 forms a coating, or layer of solid rubber 19 over the entire rubber sheet including the side walls of the perforations 20.

The accompanying drawings are diagrammatic and are simply illustrative of the several steps of my process.

From the above, it will be seen that by my process I produce a sheet of perforated sponge rubber, the outer faces of which are covered by a layer of solid, non-sponge rubber, thus completely closing and covering all of the rubber cells and interstices from contact with the outside atmosphere.

I do not limit myself to the particular apparatus, steps of process, or method of procedure shown and described as these are given simply as a means for clearly describing my invention.

What I claim is:—

1. In the process of producing perforated sheet sponge rubber having its entire surface covered with solid rubber, the steps which comprise passing perforating means through a sheet of unvulcanized rubber, maintaining said perforating means within the rubber sheet during vulcanization and vulcanizing the unvulcanized rubber sheet.

2. In the process of producing perforated sheet sponge rubber having its entire surface covered with solid rubber, the steps which comprise placing a sheet of unvulcanized rubber upon a sheet of soft rubber, forcing a plurality of perforating means through the unvulcanized rubber, maintaining said perforating means within the unvulcanized rubber sheet during vulcanization and vulcanizing the unvulcanized rubber sheet.

3. In the process of producing perforated sheet sponge rubber having its entire surface covered with solid rubber, which comprises passing perforating elements through a sheet of unvulcanized rubber, forming a mold for the perforated rubber having an interior capacity greater than the rubber, and vulcanizing and sponging the rubber within the mold while the perforating elements are within the perforations.

4. In the process of producing perforated sheet sponge rubber having its entire surface covered with solid rubber, which comprises passing perforating elements through a sheet of unvulcanized rubber, and vulcanizing the perforated rubber within a mold while the perforating elements are within the perforations, whereby a sheet of sponge rubber having solid rubber over its entirety is formed.

5. In the process of producing perforated sheet sponge rubber having its entire surface covered with solid rubber, the step which comprises forcing a plurality of perforating means carried by a plate through a sheet of unvulcanized rubber, placing the plate carrying the perforating means and the perforated unvulcanized rubber in a mold and vulcanizing the unvulcanized rubber sheet.

6. In the process of producing perforated sheet sponge rubber having its entire surface covered with solid rubber, the steps which comprise forcing a plurality of perforating means carried by a plate through a sheet of unvulcanized rubber; passing the perforating means carrying the unvulcanized rubber through openings in a mold element, the plate forming the other mold element, and vulcanizing the rubber within the spaced mold elements.

7. In the process of producing perforated sheet sponge rubber having its entire surface covered with solid rubber, the steps which comprise placing a sheet of unvulcanized rubber upon a sheet of soft rubber, forcing a plurality of perforating means carried by a plate through a sheet of unvulcanized rubber; passing the perforating means carrying the unvulcanized rubber through openings in a mold element, the plate forming the other mold element and vulcanizing the rubber within the spaced mold elements.

Signed at New York city in the county of New York and State of New York this 3rd day of April, 1925.

CHARLES T. DICKEY.